United States Patent
Baker et al.

[11] Patent Number: 5,821,636
[45] Date of Patent: Oct. 13, 1998

[54] LOW PROFILE, REDUNDANT SOURCE POWER DISTRIBUTION UNIT

[75] Inventors: Kenneth R. Baker, Houston; Kelsey R. Walker, Hockley, both of Tex.

[73] Assignee: Compaq Computer Corp., Houston, Tex.

[21] Appl. No.: 907,518

[22] Filed: Aug. 8, 1997

[51] Int. Cl.$^6$ .................................................. H02B 1/00
[52] U.S. Cl. ................................. 307/70; 307/64; 361/601
[58] Field of Search .................................. 307/64, 43, 18, 307/65, 70; 327/305; 361/600, 601; 439/55, 65; 304/492

[56] References Cited

U.S. PATENT DOCUMENTS

| | | | |
|---|---|---|---|
| 3,582,669 | 6/1971 | Dempsey | 307/18 |
| 3,666,961 | 5/1972 | Bogue et al. | 307/65 |
| 3,808,451 | 4/1974 | Pittet | 307/64 |
| 3,825,772 | 7/1974 | Ainsworth | 327/385 |
| 5,227,666 | 7/1993 | Asprey | 307/65 |

*Primary Examiner*—Jeffrey A. Gaffin
*Assistant Examiner*—Albert W. Paladini
*Attorney, Agent, or Firm*—Jenkens & Gilchrist

[57] ABSTRACT

A power distribution system, for use in computer systems and switchable to distribute uninterruptable power received from either of a first or a second power supply, includes a first and a second power input receptacle each being connected to the first and second power supplies respectively. A switch is connected to both the first and the second power input receptacles and is for switching between power received at the first power input receptacle from the first power supply and power received at the second input power receptacle from the second power supply. Two outputs, each with multiple outlet connectors, are connected to the switch and are used for distributing and outputting the power received from either of the first or second power supplies.

19 Claims, 3 Drawing Sheets

5,821,636

LOW PROFILE, REDUNDANT SOURCE POWER DISTRIBUTION UNIT

FIELD OF THE INVENTION

The present invention relates to power distribution units and more specifically to a low profile, multiple source power distribution unit for rack mountable computer system, although it is not limited to this application.

BACKGROUND OF THE INVENTION

Current power distribution systems typically include multiple converters connected to a central power supply. Often an uninterrupted power supply (UPS) is utilized for the central power supply so that continuous, uninterrupted power can be supplied to the power distribution system and ultimately to electronic components. As can be appreciated, the disruption of power to the electronic components, such as rack mounted computer systems, can often be disastrous.

Although such electronic components receive uninterrupted power during normal operation, the systems and components connected to these types of power distribution units must be powered down when the uninterruptable power supply needs to be repaired, swapped out, or upgraded.

Further, most current power distribution units are configured to take up about one "rack unit" when installed into a rack mount system, taking up valuable space therein.

It would be an advantage, therefore, to be able to provide a low profile power distribution system that has inputs for two separate power sources allowing a user to provide two types of input power and further including a bypass switch that allows the switchover from one power input to the other without power interruption.

SUMMARY OF THE INVENTION

The present invention overcomes the above identified problems as well as other shortcomings and deficiencies of existing technologies by providing low profile, multiple source power distribution unit for rack mountable computer systems.

The present invention further provides a low profile, power distribution system for use in computer systems that is switchable to distribute uninterruptable power received from either of a first or a second power supply. The power distribution system includes a first and a second power input receptacle each being connected to the first and second power supplies respectively. A switch is connected to both the first and the second power input receptacles and is for switching between power received at said first power input receptacle from the first power supply and power received at said second input power receptacle from the second power supply. Two outputs, each with multiple outlet connectors, are connected to the switch and are used for distributing and outputting the power received from either of the first or second power supplies.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
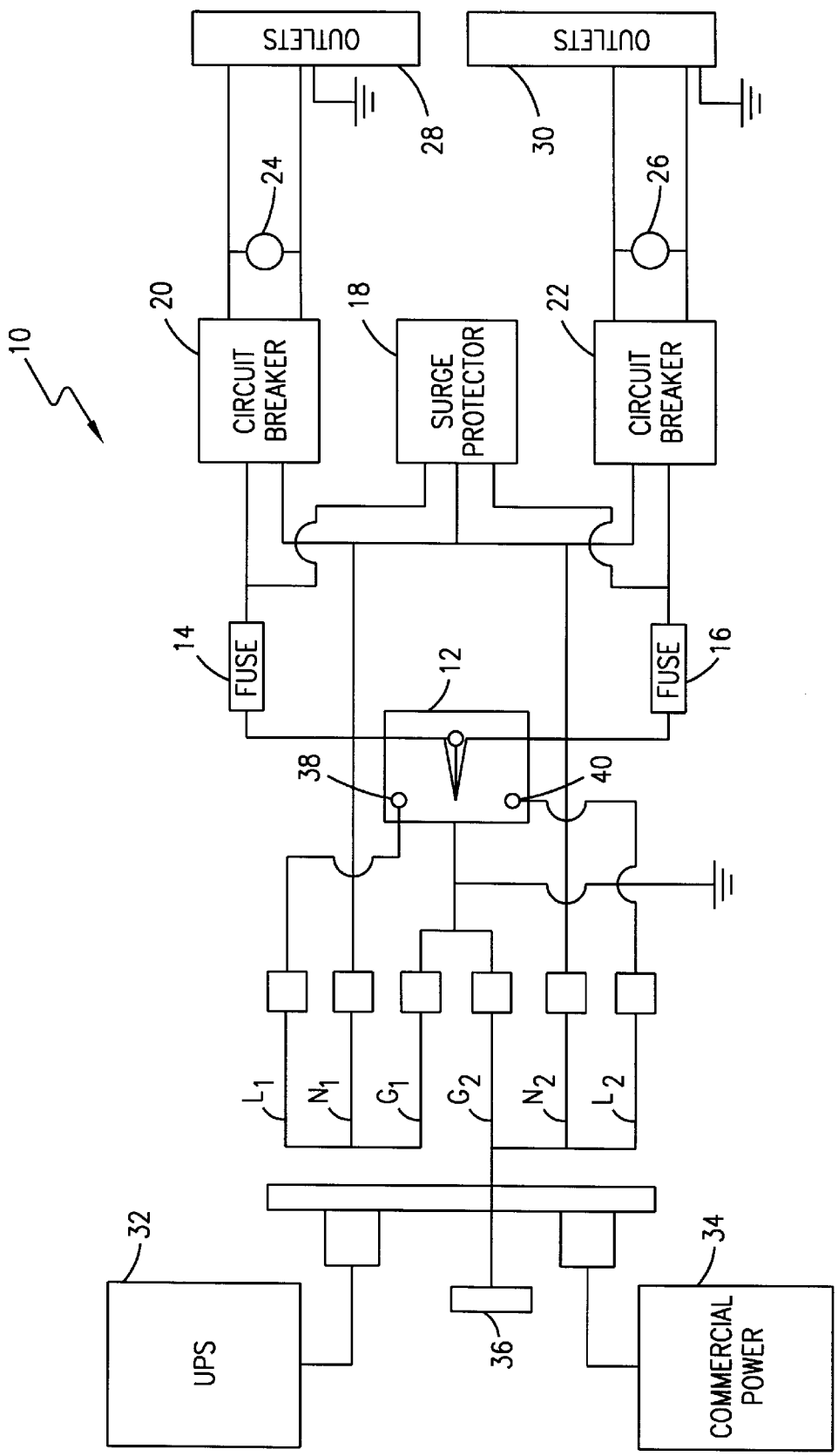
FIG. 1 is a schematic block diagram illustrating a redundant power distribution unit constructed in accordance with the principles of the present invention.

Referring now to FIG. 1, there is shown a schematic block diagram illustrating a power distribution system 10 of the present invention. As depicted, power distribution system 10 includes a bypass switch 12, fuses 14 and 16, a surge protector 18, circuit breakers 20 and 22, indicators 24 and 26, and outlets 28 and 30.

As illustrated in FIG. 1, fuses 14 and 16 are each connected to switch 12 and are effective to prevent failure of outlets 28 and 30, respectively, by opening the path of current flow to outlets 28 and 30 when the current reaches an excessive level for a predetermined period of time. In one exemplary embodiment, it is preferred that fuses 14 and 16 be slow blow fuses for preventing catastrophic overloads from damaging the power distribution unit and connected equipment.

As further depicted in FIG. 1, circuit breakers 20 is connected between fuse 14 and outlet 28, while circuit breaker 22 is connected between fuse 16 and outlet 30. Circuit breakers 20 and 22 also prevent failure of outlets 28 and 30 by opening the path of current flow from switch 12 to outlets 28 and 30. In contrast to fuses 14 and 16, which are preferred to catastrophic overloads, it is preferred that circuit breakers 22 be magnetically operated and are for protecting outlets 28 and 30 from a continuous overload supplied thereto, especially in situations where the temperature is elevated.

Still referring to FIG. 1, indicators 24 and 26 are used to indicate that outlets 28 and 30 are hot, i.e. that power is being supplied to outlets 28 and 30. In one exemplary embodiment it is preferred that indicators 24 and 26 be embedded in the circuit breakers, however, it is contemplated that other types of indicators, such as LED indicators or the like could also be utilized.

As further illustrated in FIG. 1, surge protector 18 is connected between fuse 14 and circuit breaker 20 and is also connected between fuse 16 and circuit breaker 22. Surge protector provides protection to outlets 28 and 30 from power surges received from the power supplies.

In this exemplary embodiment, the above described types of surge and spike suppression are included to provide line to neutral, neutral to ground, and line to ground protection.

Still referring to FIG. 1, switch 12 is connected to power supplies 32 and 34 and is switchable to receive power from either. This permits the user to provide two varieties of input power to power distribution unit 10. In one exemplary embodiment it is preferred that power supply 32 be an uninterruptable power supply, and further preferred that power supply 34 be a commercial power supply. In operation, the source of input power to power distribution unit 10 is controlled by the position of switch 12. In position 38, the power distribution unit 10 routes voltage from power supply 32. In position 40, the power distribution 10 routes voltage from power supply 34. All input power is spike and surge protected as described herein above, regardless of the switch position. In one exemplary embodiment, switch 12 is a quick operating "break-before-make" type of device constructed in a manner designed to ensure no more than a 7 ms break time, that permits the switching of switch 12 from one power supply to the other with negligible power interruption to outlets 28 and 30.

In operation, a user would normally keep the switch in position 38, providing uninterruptable, conditioned power from power supply 32 to outlets 28 and 30. If power supply 32 must be taken off-line for maintenance or repair, switch 12 can be quickly switched to position 40, effectively removing the uninterruptable power supply 32 from the power distribution unit 10, while effectively providing power to outlets 28 and 30 from commercial power supply 34, thereby preventing the interruption of power to the electronic devices connected to outlets 28 and 30.

Good results have been achieved by configuring power distribution unit 10 with 120VAC, 60 Hz input or a 240VAC, 50 Hz input. In the 120VAC configuration, power distribution unit 10 supports 30 amps of AC load at 120VAC, with circuit breakers 20 and 22 being 20 amp circuit breakers. Fuses 14 and 16 are 30 amp fuses. Further in the 120VAC configuration, power supply 32 is an uninterruptable power supply connected to switch 12 through a 6 foot line cord with a NEMA L5-30P connector, while power supply 34 is a commercial power supply connected to switch 12 with a 12 foot line cord with a NEMA L5-30P connector or can be hardwired the internal terminal block of power distribution unit 10. An twistlock receptacle 36 is also mounted to power distribution 10 to provide input power from larger uninterrupted power supplies. Each of outlets 28 and 30 has 6 NEMA 5-15R receptacles.

In the 240VAC configuration, power distribution unit 10 supports 20 amps of AC load at 240VAC, with circuit breakers 20 and 22 being 10 amp circuit breakers. Fuses 14 and 16 are 20 amp fuses. Power supply 32 is an uninterruptable power supply connected to switch 12 with an IEC 320 C-20 connector, while power supply 34 is a commercial power supply and is connected to switch 12 with an IEC 320 C-20 connector or can be hardwired to the internal terminal block of power distribution unit 10. Receptacle 36 is an IEC 320 C-20 outlet female receptacle connected to power distribution unit 10 and provides input power to larger uninterruptable power supplies. Each of outlets 28 and 30 include 6 IEC 320 receptacles.

Figure 2:
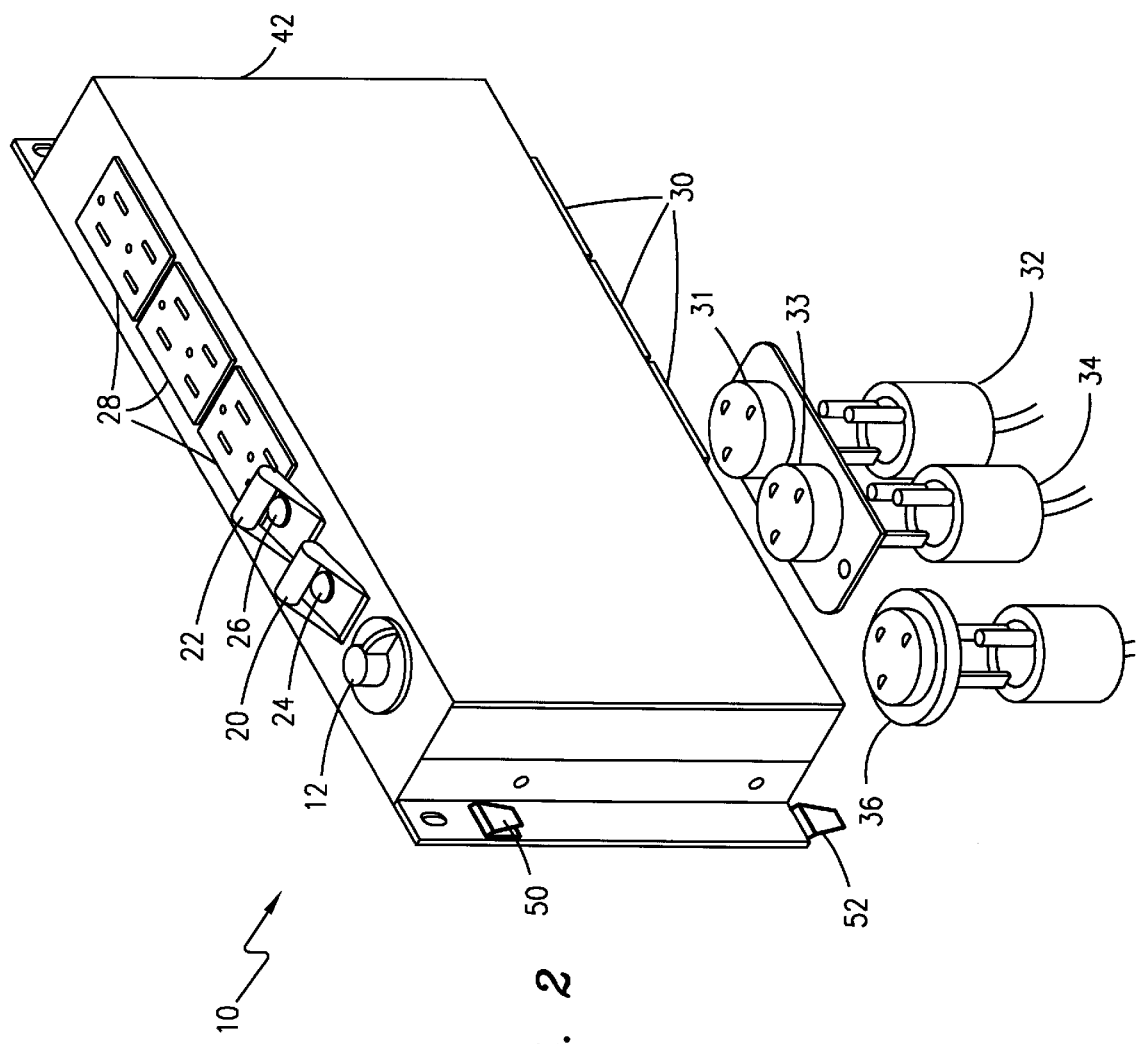
FIG. 2 is partially exploded perspective view of a redundant power distribution unit constructed in accordance with the principles of the present invention.
Figure 3:
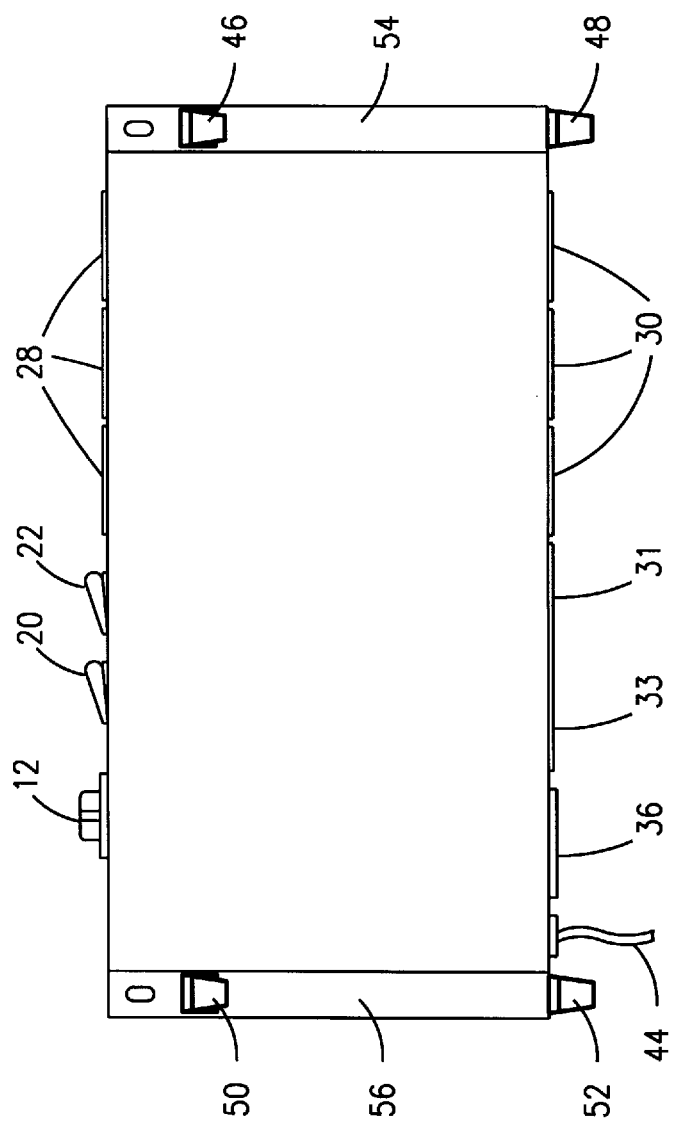
FIG. 3 is front planar view of a redundant power distribution unit constructed in accordance with the principle of the present invention as similarly illustrated in FIG. 2.

Referring now to FIGS. 2 and 3, there is illustrated an exemplary embodiment of power distribution unit 10, with FIG. 2 illustrating a perspective view thereof, with portions exploded, and with FIG. 3 illustrating a front planar view. As depicted, power distribution unit 10 includes a low profile housing 42. Housing 42 is configured for a rack mounting system, and can be installed within the rack, between the rack and the outer walls of the rack, thereby not utilizing any rack units of the rack mount system. Outlets 28 are accessible from the top edge of housing 42, while outlets 30 are accessible from the bottom edge of housing 42. The allows the easy connection of the units to be mounted in the rack system to the power distribution unit whether mounted above or below power distribution unit 10.

As further illustrated in FIGS. 2 and 3, circuit breakers 20 and 22, indicators 24 and 26, and switch 12 are also accessible from the top edge of housing.

Referring now to FIG. 2, connectors 31 and 33, which are illustrated exploded from housing 42, are positioned along the bottom edge of housing 42 and are for receiving power supplies 32 and 34, respectively. As further illustrated in FIG. 2, receptacle 36, also illustrated exploded from housing 42, is positioned along the bottom edge of housing 42.

Referring again to FIGS. 2 and 3, tabs 46 and 48 are connected to an extended portion 54 of housing 42, while tabs 50 and 52 are connected to an extended portion 56 of housing 42. Tabs 46–52 are for mounting power distribution unit 10 within the rack unit.

Referring now to FIG. 3, there is further depicted a hard wire connection 44, which a discussed herein above, permits the hardwire connection of commercial power supply 34.

Those skilled in the art can realize that the teachings of the present invention, as described hereinabove, provide a low profile power distribution unit that is connectable to redundant power supplies to provide continuous power to the power distribution unit, and ultimately to the systems receiving power from the power distribution unit.

Although a preferred embodiment of the apparatus of the present invention has been illustrated in the accompanying Drawings and described in the foregoing Detailed Description, it will be understood that the invention is not limited to the embodiment disclosed, but is capable of numerous rearrangements, modifications and substitutions without departing form the spirit of the invention as set forth and defined by the following claims.

What is claimed is:

1. A power distribution system for use in computer systems, said power distribution system switchable to distribute uninterruptable power received from either of a first or a second power supply, said power distribution system comprising:

a first and a second power input receptacle, each of said first and second power inputs receptacles connectable to the first and second power supplies respectively;

a switch connected to each of said first and second power input receptacles, said switch having a first and second position, such that when said switch is in said first position, power is received at said first power input receptacle from the first power supply and when said switch is in said second position, power is received at said second input power receptacle for the second power supply;

a first output connected to said switch for distributing and outputting the power received from either of the first or second power supplies, said first output including a plurality of outlet connectors; and a low profile housing for at least housing each of said first and second power input receptacles, said switch, and said first output, said low profile housing being vertically mountable in a computer system rack cabinet.

2. The power distribution system as recited in claim 1, further comprising a second output connected to said switch for distributing and outputting the power received from either of the first or second power supplies, said second output including a plurality of outlet connectors.

3. The power distribution system as recited in claim 1, wherein said switch is a break-before-make switch.

4. The power distribution system as recited in claim 1, further comprising a first circuit breaker connected between said first output and said switch and a second circuit breaker connected between said second output and said switch.

5. The power distribution system as recited in claim 1, further comprising a surge protector connected between said switch and said first output.

6. The power distribution system as recited in claim 1, further comprising a fuse connected between said switch and said first output.

7. The power distribution system as recited in claim 1, further comprising a low profile housing for housing said first and second power input receptacles, said switch, and said first output.

8. The power distribution system as recited in claim 7, wherein said low profile housing is mounted vertically in a computer rack cabinet.

9. A power distribution system operable to distribute uninterrupted power received from a selected one of a plurality of power supplies, said power distribution system comprising:
- a plurality of power input receptacles, each of said plurality of power input receptacles connected a corresponding one of the plurality of power supplies;
- a switch connected to each of said plurality of power input receptacles, said switch having a plurality of positions corresponding to each of said plurality of power input receptacles, such that when said switch is in one of said plurality of positions, power is received at said corresponding power input receptacle from one of the power supply connected thereto;
- a plurality of outputs, each of said plurality of outputs connected to said switch for distributing and outputting the power received from one of the plurality of power supplies; and
- a low profile housing for at least housing each of said plurality of power input receptacles, said switch, and said plurality of outputs, said low profile housing being vertically mountable in a rack cabinet.

10. The power distribution system as recited in claim 9, wherein each of said plurality of outputs includes a plurality of outlet connectors.

11. The power distribution system as recited in claim 10, wherein said switch is an electromechanical bypass switch.

12. The power distribution system as recited in claim 11, wherein said switch is a break-before-make switch.

13. The power distribution system as recited in claim 12, further comprising a plurality of circuit breakers, with at least one of said plurality of circuit breakers connected between each of said plurality of outputs and said switch.

14. The power distribution system as recited in claim 13, further comprising at least one surge protector connected between said switch and each of said plurality of outputs.

15. The power distribution system as recited in claim 14, further comprising a plurality of fuses, with at least one of said plurality of fuses connected between said switch and each of said plurality of outputs.

16. The power distribution system as recited in claim 15, further comprising a low profile housing for housing each of said plurality of power input receptacles, said switch, and each of said plurality of outputs.

17. The power distribution system as recited in claim 15, wherein said low profile housing is mounted vertically in a electronic system rack cabinet.

18. A power distribution system for use in computer systems, said power distribution system switchable to distribute uninterruptable power received from either of a first or a second power supply, said power distribution system comprising:
- a first and a second power input receptacle, each of said first and second power inputs receptacles connectable to the first and second power supplies respectively;
- a switch connected to each of said first and second power input receptacles, said switch having a first and second position, such that when said switch is in said first position, power is received at said first power input receptacle from the first power supply and when said switch is in said second position, power is received at said second input power receptacle for the second power supply;
- a first output and a second output, each of said first and second outputs being connected to said switch for distributing and outputting the power received from either of the first or second power supplies, each of said first and second outputs including a plurality of outlet connectors; and
- a low profile housing for at least housing each of said first and second power input receptacles, said switch, and said first and second outputs, said low profile housing being vertically mountable in a computer system rack cabinet.

19. The power distribution system as recited in claim 18, wherein said switch is a break-before-make electromechanical bypass switch.

* * * * *